H. L. DIXON.
GLASS POT FURNACE.
APPLICATION FILED JULY 22, 1911.

1,017,391.  Patented Feb. 13, 1912.
4 SHEETS—SHEET 1.

WITNESSES  INVENTOR

H. L. DIXON.
GLASS POT FURNACE.
APPLICATION FILED JULY 22, 1911.

1,017,391.

Patented Feb. 13, 1912.

4 SHEETS—SHEET 2.

WITNESSES

INVENTOR

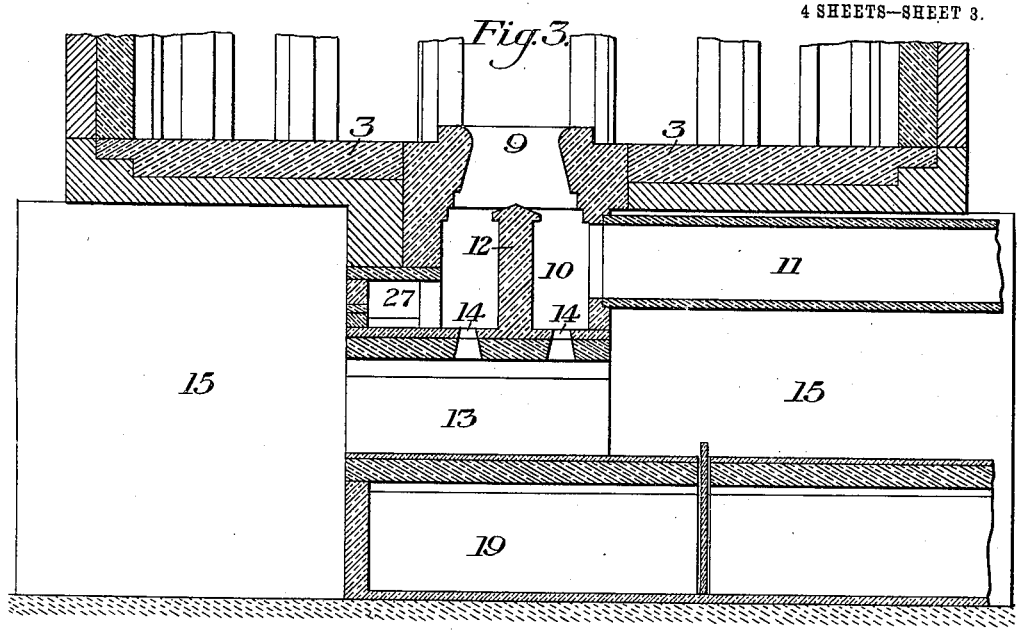
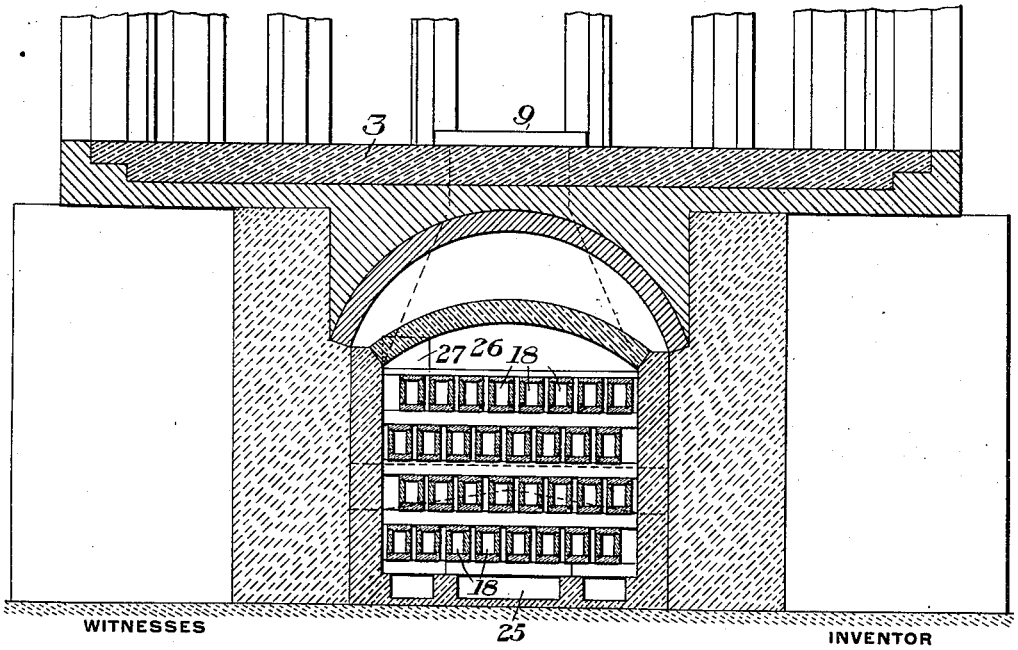

H. L. DIXON.
GLASS POT FURNACE.
APPLICATION FILED JULY 22, 1911.

1,017,391.

Patented Feb. 13, 1912.

4 SHEETS—SHEET 4.

WITNESSES

INVENTOR

UNITED STATES PATENT OFFICE.

HENRY L. DIXON, OF KNOXVILLE, PENNSYLVANIA, ASSIGNOR TO H. L. DIXON COMPANY, OF PITTSBURGH, PENNSYLVANIA, A CORPORATION OF PENNSYLVANIA.

GLASS-POT FURNACE.

1,017,391.          Specification of Letters Patent.      Patented Feb. 13, 1912.

Application filed July 22, 1911. Serial No. 640,031.

*To all whom it may concern:*

Be it known that I, HENRY L. DIXON, of Knoxville, Allegheny county, Pennsylvania, have invented a new and useful Improvement in Glass-Pot Furnaces, of which the following is a full, clear, and exact description, reference being had to the accompanying drawings, forming part of this specification, in which—

Figure 1:
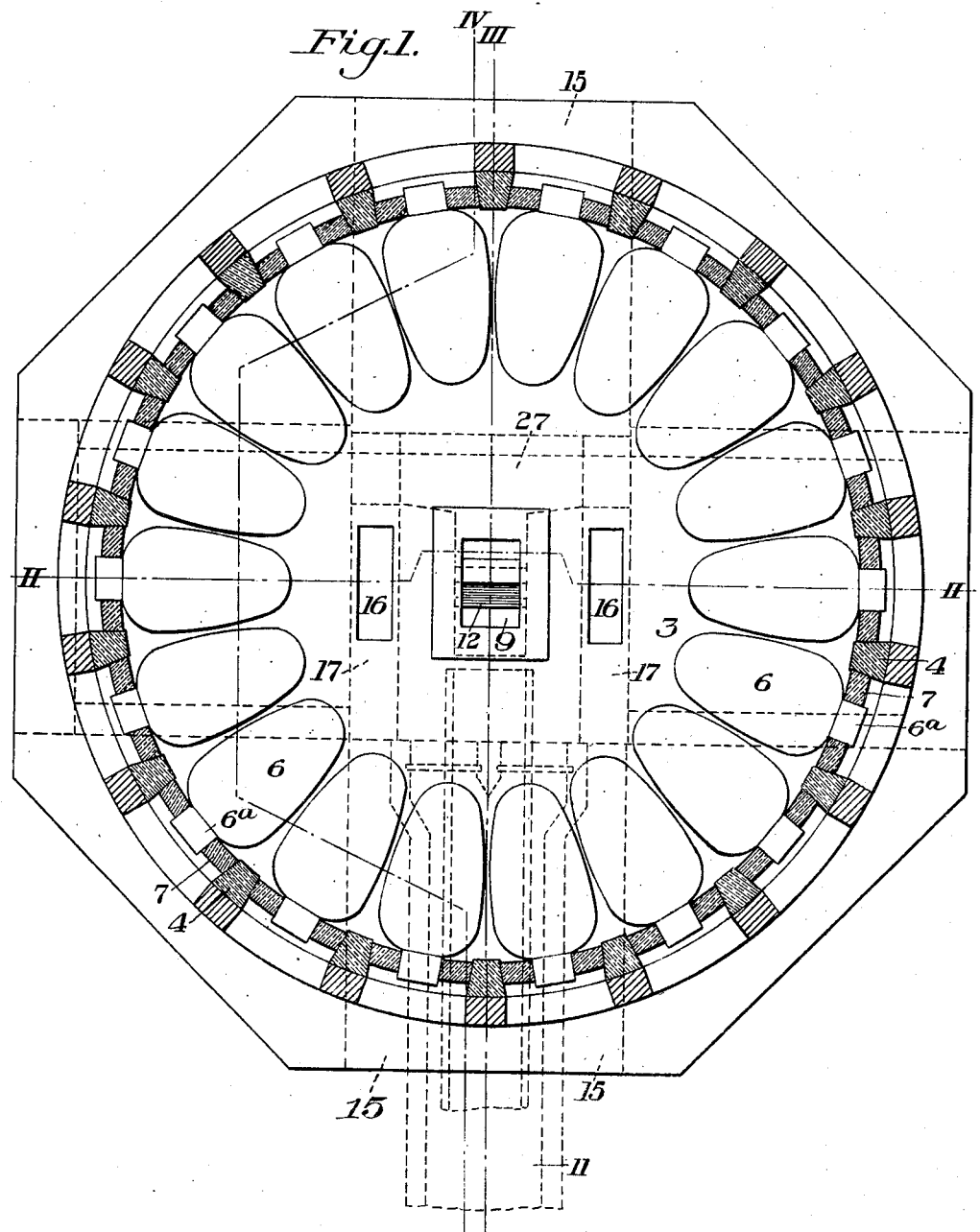
Figure 2:
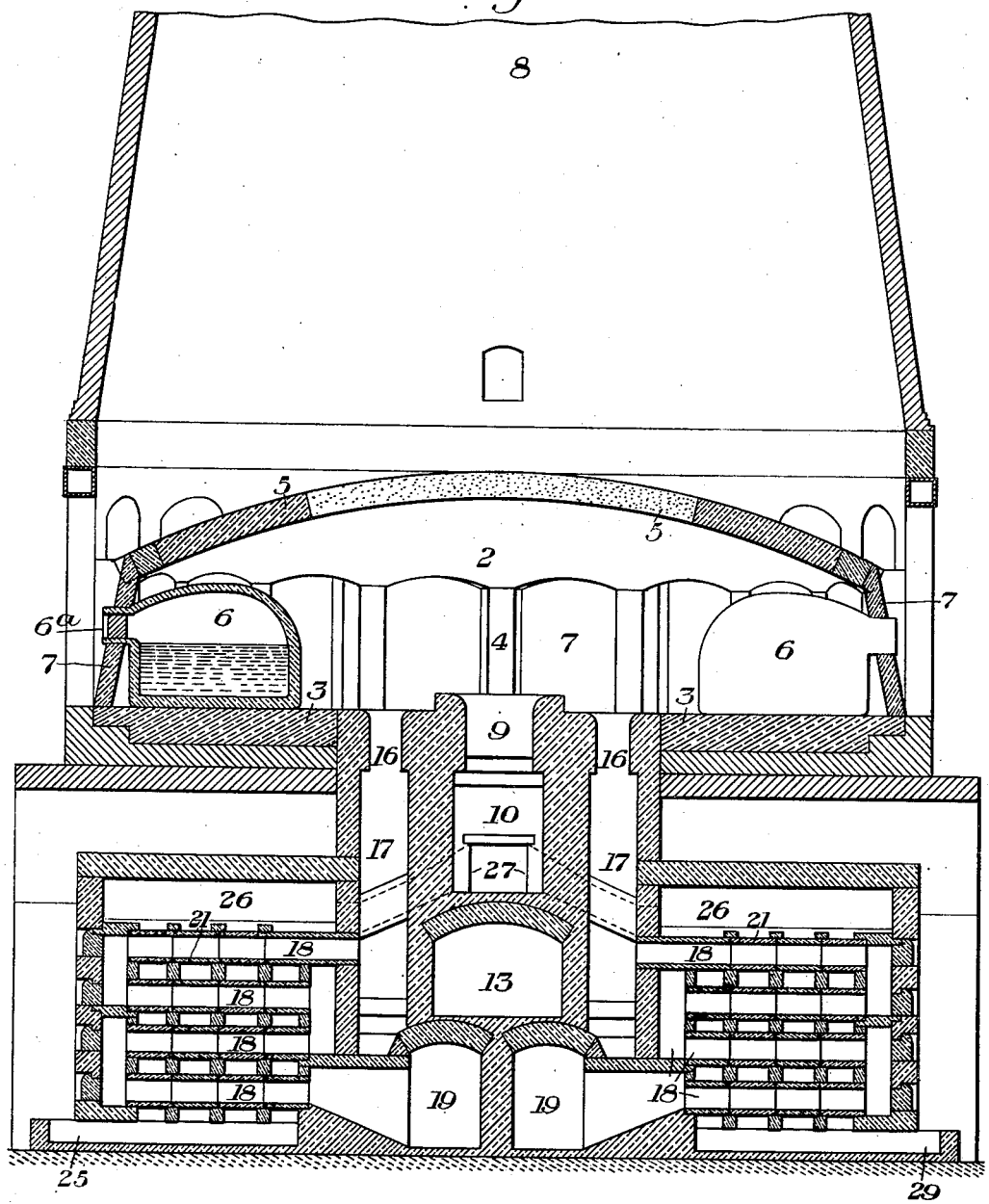
Figure 5:
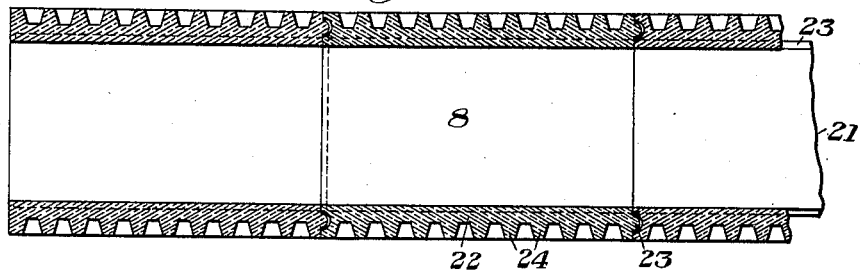
Figure 6:
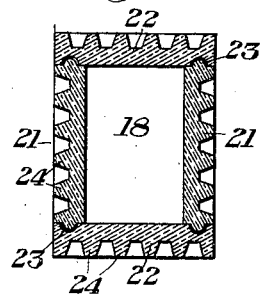
Figure 7:
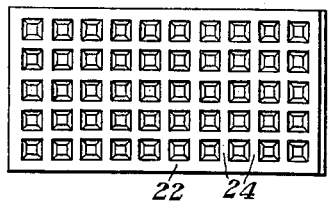
Figure 8:
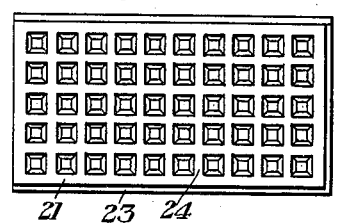

Figure 1 is a sectional plan view of a furnace embodying my invention. Fig. 2 is a vertical section on the line II—II of Fig. 1. Figs. 3 and 4 are sections taken on the lines III—III and IV—IV respectively of Fig. 1. Fig. 5 is a longitudinal section of a portion of the recuperator canals. Fig. 6 is a cross section of the same. Fig. 7 is a plan view of one of the top-forming canal members or tiles; and Fig. 8 is a similar view of one of the side canal members.

My invention has relation to glass pot furnaces, and is designed to provide a furnace of the recuperative type having an improved arrangement of its air, gas and waste flues, whereby an effective heating of the air is obtained, together with an effective distribution of the products of combustion; also to provide a furnace of this character in which the inlet and outlet ports or flues are so arranged as to permit of the simultaneous heating of a full circle of pots in the heating chamber of the furnace.

The nature of my invention will be best understood by reference to the accompanying drawings, in which I have shown the preferred embodiment thereof, and which will now be described, it being premised, however, that various changes may be made in the details of construction, arrangement and combination of parts without departing from the spirit and scope of my invention as defined in the appended claims.

In these drawings, the numeral 2 designates the heating chamber of the furnace, having the floor or bench 3, the side walls 4 and the crown or roof 5.

6 designates the usual glass melting pots which are arranged in a circular series on the floor or bench 3 around the outer portion of the chamber 2.

7 designates false or temporary breast walls which close the glass pot openings around their necks 6ª.

8 is the usual ventilator stack.

9 is a central port opening in the floor or bench 3 at which combustion takes place. This opening extends downwardly into the central chamber 10 in the base of the furnace and to which gas is supplied by the pipe or conduit 11 (see Figs. 1 and 3).

12 is a central division wall in the chamber 10.

13 is a clean-out space below the chamber 10, the floor of the latter having the vertical openings 14, which are temporarily closed with removable plugs, leading into the space 13. The space 13 opens at its ends into the arched passages or caves 15, which are formed on the base of the furnace, the gas conduit 11 extending in through one of these passages or caves 15.

16 designates two down-take openings or ports, for the waste gases or products of combustion. These openings 16 lead through the floor or bench of the furnace at opposite sides of the port opening 9, and into vertical flues 17. Leading laterally from each of the vertical waste flues 17 is a series of waste passages or canals 18 of the usual recuperator zig-zag form, and communicating at their lower ends with a stack flue 19. The two stack flues 19 are shown as merging into a single stack flue (see Fig. 1). Each of the passages or canals 18 is shown as consisting of a plurality of horizontal portions, one above another, with vertical portions connecting the ends of the horizontal portions. Each canal or horizontal portion (see Sheet IV of the drawings) may be conveniently formed by the refractory slabs or tiles 21 and 22, having interfitting projections and recesses 23, and which are assembled to form a conduit or canal of rectangular cross-section. One face of each slab or tile, preferably the outer face, is formed with a plurality of indentations or projections 24 which very greatly increase the heat radiating surface of the conduit. If the indentations and projections are on the inner face of the tiles or slabs, they will likewise act to increase the heat-absorbing surface.

25 designates air intake openings below the passages 18. The air entering these openings passes upwardly between and around the walls of the canals or passages 18 in a more or less irregular path, and in so doing becomes highly heated. It rises into the chamber 26 above the passages 18, and thence into a cross-flue 27 (which is common to both chambers 26), and thence by the flue 27 into the lower portions of the chamber 10 and above the cross wall 12 where it mixes with the gas. The products of combustion pass upwardly and are then deflected laterally and downwardly by the arched roof or crown 5 over and around the pots, finally passing out through the openings 16 into the flues 17 and thence into the recuperator canals or conduits 18 and to the stack flues.

It will be observed that the openings 9 and 16 are so arranged that all the pots will be subjected to substantially the same heating conditions; furthermore, that a complete circle of glass pots may be employed. Heretofore, the inlet and outlet ports have been so arranged as to make it necessary to omit one or more of the pots in order to accommodate the ports, and to avoid danger of breaking the pots in close proximity to them. Under my broader claims I consider that the particular arrangement of the recuperators and flues and passages underneath the floor or bench of the furnace may be widely changed without departing from the spirit and scope of my invention.

I claim:—

1. A recuperative glass pot furnace having its bench provided with means for supporting a complete circle of glass pots and having fuel supply offtake and ports leading through its central portion at points inside of the circle of pots, together with supply and offtake flues communicating respectively with said supply and offtake ports and maintaining a constant circulation of the products of combustion therethrough in one direction, substantially as described.

2. A recuperative glass pot furnace having its bench provided with means for supporting a complete circle of glass pots and having a central fuel supply port and an offtake port at each side of the fuel supply ports, all of said ports being within the circle of pots, together with supply and offtake flues connected respectively to said supply and offtake ports and arranged to maintain a circulation of the products of combustion continuously in one direction, substantially as described.

3. A recuperative glass pot furnace having its bench provided with means for supporting a complete circle of glass pots and having gas and air supply ports discharging centrally through the support for the furnace pots, said bench also having offtake ports leading downwardly therethrough at opposite sides of the supply port and within the circle of pots, substantially as described.

4. A recuperative glass pot furnace having its bench provided with means for supporting a complete circle of glass pots and having a gas and air supply port discharging centrally through said bench, said bench also having an offtake port at each side of the first named port and within the circle of pots, substantially as described.

5. A recuperative glass pot furnace having its bench provided with means for supporting a complete circle of glass pots and having a central fuel supply port, and offtake ports adjacent to the supply port, and a series of flues communicating respectively with said supply and offtake ports, substantially as described.

In testimony whereof, I have hereunto set my hand.

HENRY L. DIXON.

Witnesses:
   GEO. H. PARMELEE,
   H. M. CORWIN.